March 10, 1970   W. S. DURRELL ET AL   3,499,737
METHOD AND APPARATUS FOR SPARGING CHLORINE INTO
A REACTOR FOR PRODUCING CYANOGEN CHLORIDE
Filed Feb. 20, 1968   2 Sheets-Sheet 1

INVENTORS
WILLIAM S. DURRELL
YELAGONDAHALLY S. SURYANARAYANA

BY *Wendsroth, Lind & Ponack*

ATTORNEYS

Fig. 2

Table I

Selected Data from Sparging Runs

| Run | Column Dia. cm | Sparger Operation | % Cl₂ Excess | Input g/min. HCN | Input g/min. Cl₂ | Input g/min. H₂O | Bottoms Analysis HCl | Bottoms Analysis HCN | Bottoms Analysis N₂ by Boiling | Bottoms Analysis % Hydrolysis Loss by Boiling | % Conversion (Based on HCN) | Overhead Analysis HCN | Overhead Analysis Cl₂ | Overhead Analysis CNCl | Liquid Hgt in Col. (cm) |
|---|---|---|---|---|---|---|---|---|---|---|---|---|---|---|---|
| 1. | 2.0 | Good | 39 | .462 | 1.70 | 2.92 | 17.4 | 0.38 | 0.35 | 4.5 | 97.1 | .03 | 22 | 78.0 | 34 |
| 2. | 2.0 | Good | 30 | .508 | 1.70 | 2.81 | 19.1 | 0.29 | 0.37 | 4.8 | 97.9 | .91 | 8.0 | 91.1 | 34 |
| 3. | 2.0 | Good | 34 | .485 | 1.73 | 2.84 | 15.9 | 1.40 | 0.46 | 6.3 | 88.7 | 2.7 | 41.5 | 55.8 | 31 |
| 4. | 2.0 | Good | 30 | .495 | 1.73 | 2.83 | 18.7 | 0.05 | 0.30 | 4.0 | 99.6 | 0.6 | 24.7 | 74.6 | 33 |
| 5. | 2.0 | Excel. | 30 | .465 | 1.75 | 2.86 | 19.0 | 0.01 | 0.20 | 2.6 | 100 | 0.5 | 26.4 | 73.2 | 31 |
| 6. | 2.5 | Excel. | 60 | .797 | 3.35 | 4.12 | 18.1 | Neg. | 0.06 | 0.80 | 100 | 0.44 | 31.8 | 67.7 | 54 |
| 7. | 2.5 | Excel. | 44 | 1.08 | 4.10 | 6.03 | 19.4 | Neg. | 0.04 | 0.53 | 100 | 0.21 | 35.9 | 63.9 | 54 |
| 8. | 2.5 | Excel. | 20 | 1.17 | 3.65 | 6.66 | 18.3 | Neg. | 0.03 | 0.44 | 88.5 | 1.03 | 11.9 | 87.9 | 67 |
| 9. | 2.5 | Excel. | 0 | 1.17 | 3.10 | 6.60 | 18.3 | Neg. | 0.031 | 0.30 | 92.6 | 2.92 | 4.31 | 96.8 | 67 |
| 10. | 5.0 | Excel. | 5 | 1.19 | 3.25 | 6.58 | 19.4 | Neg. | N/A | N/A | 97.1 | 0.31 | 5.2 | 94.5 | 75 |
| 11. | 5.0 | Excel. | 5 | 1.64 | 4.52 | 9.06 | 18.8 | 0.01 | 0.49 | 6.3 | 86.9 | 0.34 | 8.06 | 91.6 | 71 |

INVENTORS
William S. Durrell
AND
Yelagondahally S. Suryanarayan

By Wenderoth, Lind and Ponack

ATTORNEYS

United States Patent Office 3,499,737
Patented Mar. 10, 1970

3,499,737
METHOD AND APPARATUS FOR SPARGING CHLORINE INTO A REACTOR FOR PRODUCING CYANOGEN CHLORIDE
William S. Durrell and Yelagondahally S. Suryanarayana, Mobile, Ala., assignors to Geigy Chemical Corporation, Ardsley, N.Y.
Continuation-in-part of application Ser. No. 608,129, Jan. 9, 1967. This application Feb. 20, 1968, Ser. No. 712,320
Int. Cl. C01c *3/00;* B01f *3/04*
U.S. Cl. 23—359                                3 Claims

ABSTRACT OF THE DISCLOSURE

A sparger, for example of fritted glass, is positioned in the bottom of a reactor flooded with an aqueous reaction medium which is about 20% HCl and chlorine is sparged into the reaction medium through the sparger while hydrogen cyanide is fed into the reactor to produce cyanogen chloride. Heat is extracted from the reactor during the reaction, and cyanogen chloride is taken off the top of the reactor while hydrochloric acid at about 20% concentration is taken off the bottom of the reactor.

This application is a continuation-in-part of our application Ser. No. 608,129, filed Jan. 9, 1967, now abandoned.

BACKGROUND OF THE INVENTION

Field of the invention

This invention relates to a method and apparatus for the production of cyanogen chloride, and more particularly it relates to the production of cyanogen chloride in a flooded cooled reactor column at higher acid conditions than heretofore thought possible by introducing gaseous chlorine into the reactor column by means of a sparger.

Cyanogen chloride is a valuable intermediate for the production of cyanuric chloride, which in turn is useful as an intermediate for the manufacture of many products, such as chemotherapeutic agents, herbicides, dyes, brightening agents, synthetic resins, plastics, rubber, explosives and other materials.

Description of the prior art

A presently used commercial process of preparing cyanogen chloride for conversion into cyanuric chloride is described in U.S. Patent 3,197,273 in the name of Elwood Bruce Trickey. In this process, chlorine and hydrogen cyanide are charged into the reaction section of a packed column having a purification, washing or scrubbing section, a reaction section, and a stripping section. Water is fed in at the top of the scrubbing section and steam is introduced at the base of the column at the bottom of the stripping section. By maintaining the proper rates of feed of the various materials, the temperature and conditions in the column can be maintained such that a high yield of cyanogen chloride is obtained as a gas at the top of the reactor.

The process of this patent, while it is quite satisfactory with respect to the quality and amount of the product which it is desired to produce, also produces at the bottom of the reactor column a by-product of dilute, i.e. 2–3% aqueous hydrochloric acid. This by-product is relatively easily disposed of when the quantity thereof is small but in actual practice, the amounts produced are so great that they cannot be disposed of simply by discharging into a stream or river without exceeding the amount which can be so discharged as established by pollution control standards. The alternative of concentrating the dilute hydrochloric acid and using it in other processes or selling it is not economically feasible, since the costs of concentrating the dilute acid are greater than purchasing concentrated acid from commercial sources.

Production of the cyanogen chloride under conditions which would produce the by-product aqueous hydrochloric acid at higher concentrations have heretofore appeared to be an unlikely solution to the problem of by-product disposal or by-product recovery, because of the twin problems of intolerable, from the commercial standpoint, losses of the cyanogen chloride reaction product by hydrolysis and directly from the bottom of the reaction column along with the by-product hydrochloric acid. The necessity to keep hydrolysis losses low and substantially eliminate the direct loss of the cyanogen chloride are essential to the successful commercial production of cyanogen chloride. A third essential condition is the prevention of the formation of $NCl_3$, which is extremely explosive and therefore an undesired reaction product not only from the standpoint of loss of the primary product but also from the standpoint of safety.

SUMMARY OF THE INVENTION

The present invention relates to a method and apparatus for overcoming the problems described above and carrying out the reation of chlorine and hydrogen cyanide to produce cyanogen chloride by feeding the hydrogen cyanide into one end of a flooded reaction section of a reaction and scrubbing column and feeding gaseous chlorine into the other end of the reaction section through a sparging means. Heat is extracted from the flooded section of the column by circulating cooling fluid around the flooded section of the column. By carefully controlling the conditions in the reaction column, a very high rate of conversion to cyanogen chloride can be achieved at low hydrolysis and production of aqueous hydrochloric acid in concentrations up to about 20%. The throughput of the reactants can be increased as compared with conventional packed columns and the heat and mass transfer is excellent.

BRIEF DESCRIPTION OF THE DRAWINGS

The invention will be described in connection with the accompanying drawings, in which:

FIG. 2 is a table showing the results of runs made in the reaction section of the reaction column shown in FIG. 1.

DESCRIPTION OF A PREFERRED EMBODIMENT

Figures 1, 3:
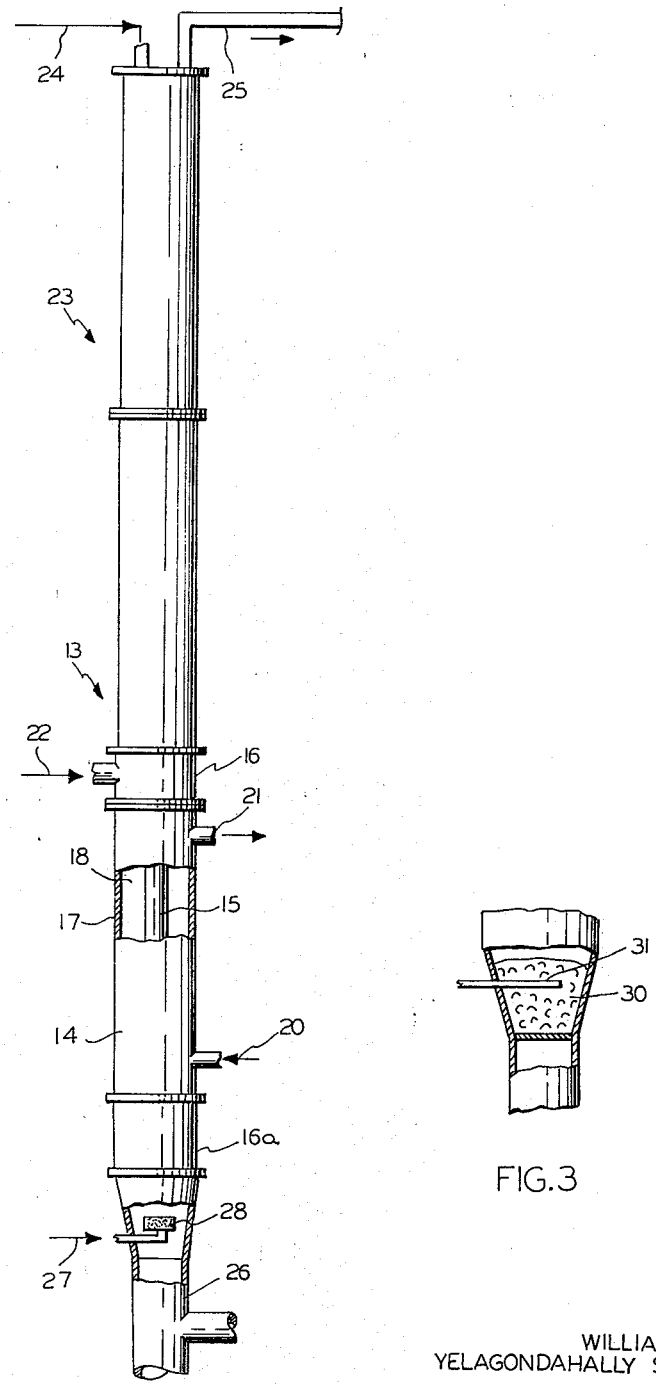
FIG. 1 is a schematic view of an apparatus including flooded reactor type reaction column having a sparging means in the lower end thereof and arranged to carry out the method of the present invention.
FIG. 3 is a fragmentary sectional view showing a different form of sparger.

The apparatus of the present invention comprises a reaction and scrubbing column generally designated 13, which has a reaction section 14 having at least one inner tube 15 extending between a feed inlet chamber 16 and an outlet chamber 16a, and which has an outer tube 17 surrounding the inner tube or tubes to form a cooling fluid chamber 18 through which cooling fluid can be passed from a cooling fluid inlet 20 to a cooling fluid outlet 21. Opening into the feed inlet chamber 16 is an HCN inlet 22. Next above the reaction section 14 is a scrubbing section 23 which is a packed tower and which has a water inlet 24 and a gas outlet 25 at the top thereof through which water is fed into the scrubbing section 23 and gas produced within the reactor and which flows up through the scrubbing section is taken out of the reaction and scrubbing column.

Connected to the bottom of the outlet chamber 16 is an HCl line 26 which can extend to a stripping means, such as a stripping column as disclosed in co-pending application Ser. No. 608,076, filed on Jan. 9, 1967, now abandoned, and entitled "Method and Apparatus for Stripping Cyanogen Chloride From a Reaction Medium." The arrangement is such as to maintain a head in the reaction section 14 of the column 13. A chlorine inlet 27 is provided in the outlet chamber 16a, through which gaseous chlorine is fed into the reaction section of the column. On the end of the chlorine inlet 27 is a sparger 28 which sparges the gaseous chlorine into the liquid within the reaction section 14.

In operating the apparatus to carry out the method, the reaction section of the column is kept flooded with liquid reaction medium, which is aqueous hydrochloric acid with HCN, chlorine and CNCl dissolved therein and also in gaseous form therein. Gaseous chlorine is fed into the chlorine inlet 27 and gaseous or liquid hydrogen cyanide is fed into the top of the reaction section through the HCN inlet 22. The amount of chlorine is in excess of that which is theoretically necessary to convert all of the HCN into CNCl. Water is fed into the top of the reaction and scrubbing column through the water inlet 24. A cooling fluid, for example water, is circulated through the cooling fluid chamber 18, being fed into the chamber through the inlet 20 and flowing out through the outlet 21. This cooling fluid removes the heat of reaction from the reaction section 14 in which the main part of the reaction takes place.

Chlorine fed into the bottom of the reaction section 14 through the outlet chamber 16a is sparged so as to form a mass of very fine bubbles which rise through the inner tube or tubes 15 and under ideal conditions will substantially fill the liquid in the tube or tubes 15 with these fine bubbles. Since the overall flow of liquid is in the downward direction through the reaction section 14, the gaseous chlorine will move in countercurrent flow to the downflowing HCN in the acid solution. The continual formation of bubbles provides renewed surface area for efficient gas-liquid contact. At the same time the effective mixing due to the action of the sparged chlorine gas provides for good heat transfer, thus promoting the removal of heat from the reaction section.

Gaseous CNCl will flow up through the scrubber section 23 where it is washed by the downflowing water to remove any HCN therein, and gaseous CNCl together with any excess chlorine will flow out through the gas outlet at the top of the reaction and scrubbing column. Aqueous hydrochloric acid containing very small amounts of HCN and chlorine and saturated with CNCl will be pumped out of the bottom of the outlet chamber 16a and will be supplied to a stripping means in order to strip it of the CNCl and the chlorine. The chlorine fed through the sparger 28 can be chlorine which is used in the stripping means to strip CNCl and the chlorine which is stripped in the stripping means.

The temperature conditions in the reaction and scrubbing column are kept below the temperature of the column used in the process described in the above-mentioned patent. Sufficient cooling liquid is passed through the cooling fluid chamber 18 to keep the temperatures in the reaction section 14 between about 25 and 60° C. Immediately above the top of the reaction section 14 in the lower end of the scrubbing section 23, the temperature will rise due to the fact that a small part of the reaction will be taking place here, but it is preferred to control the conditions so that the temperature in the lower part of the scrubbing section does not rise much above about 65 to 70° C. The amount of heat of reaction extracted in the reaction section 14 is sufficient so that with the transfer of heat from the scrubbing section 23 of the column and the cooling effect of the water fed into the top of the column, the temperatures within the scrubbing section fall rather rapidly higher up in the scrubbing section 23, until at the top of the column, the temperature has fallen to near 25° C. It is preferred to reach this temperature at the top of the column, since at temperatures above this, not all of the HCN may be stripped out of the cyanogen chloride. To aid in reaching these conditions, the temperature of the water fed into the top of the column should be between 13–25° C., and preferably 15–20° C. Lower temperatures may cause liquification of the cyanogen chloride.

The amounts of the reaction products HCN and chlorine fed to the reaction section 14 and the amount of water fed to the top of the reaction and scrubbing column 23 are controlled to cause the reaction to be carried out so that the concentration of the aqueous hydrochloric acid at the bottom of the reaction and scrubbing column is between about 17 and 20%. The actual amounts used will depend mainly on the size of the apparatus, and only small variations should be necessary to take into account the temperature of water being fed to the top of the scrubbing section 23. Temperature control of the reaction will be mostly by means of the cooling fluid being passed through the cooling fluid chamber 18 and the temperature and amounts of such cooling fluid.

The specific sparger 28 can be any of the conventional spargers which are available and which will stand up under the acid conditions in the reaction section 14 of the column. In the following examples a fritted glass sparger was used. In larger diameter reactors, however, it has been found desirable to use a packed section of saddles or rings which acts as a sparger equal in diameter to the diameter of the reactor. Such a sparger is shown in FIG. 3 in which a packed section 30 is shown packed with saddles 31.

In order to illustrate the invention more fully, a series of examples will be given for a reactor apparatus of a specific size and configuration. In these examples, the apparatus did not have the scrubbing section 23, but it is contemplated that in the normal use, such a scrubbing section will be used in order to remove the trace amounts of HCN from the gas coming off the top of the reaction section.

EXAMPLES 1–5

The reaction section 14 was a column 80–120 cm. high having an inside diameter of 2 cm. and having a cooling jacket therearound. The column was filled to the desired height with 20% HCl and during the operation a 15% aqueous HCN was fed to the top of the column by pumping it in at a point just under the surface of the liquid in the column. The bottom drain-off rate was the same as the HCN-H$_2$O input. The HCN and Cl$_2$ feed rates of HCN and Cl$_2$ were adjusted so that with complete conversion of the HCN to CNCl approximately 20% HCl would be produced in the column bottoms. The column was run for about 1–4 hours in order to reach equilibrium conditions. The operating conditions and results are as shown in runs 1–5 of Table I shown in FIG. 2.

It will be seen from the data in Table I that all of these runs were at rather large excesses of chlorine. While the conversion rates were high, being from about 89–100% and the hydrolysis losses were not unacceptable, the amount of chlorine in the overhead gases was high, the functioning of the sparger was not as efficient as it might have been, and the rates of throughput were necessarily rather low.

EXAMPLES 6–9

The apparatus was similar to that of Examples 1–5 except that the column was 2.5 cm. in diameter. The height of the reactant in the column was increased, and in runs 8 and 9 the excess of chlorine was reduced. The operating conditions and results are as shown in runs 6–9 of Table I.

The results for these runs show that larger quantities of materials can be handled, and even with reduced excess of chlorine, which reduces the amount of chlorine in the overhead gases, the conversion rates are still very good and with an increased rate of HCN feed the hydrolysis losses are greatly reduced. The increase in HCN losses in the overhead gases is of significance in indicating the need for a scrubbing column.

EXAMPLES 10 AND 11

The apparatus was again similar to that of Examples 1–5 except that the column was 5 cm. in diameter. The height of the reactant was increased and the excess of chlorine was reduced. The operating conditions and results are shown in runs 10 and 11 of Table 1.

As with the results of Examples 6–9, the results for runs 10 and 11 show that larger quantities of materials can be handled, and even with the reduced excess of chlorine the conversion rates are very good and the hydrolysis losses are acceptable.

It should be pointed out that the hydrolysis losses were determined by boiling the reaction medium taken out of the bottom of the column, and that this in itself increases hydrolysis of the cyanogen chloride. In reality, the losses due to hydrolysis within the reaction column were very much smaller than those in the table. In connection with runs 6 and 7, the bottoms from the reaction section were stripped by bubbling $N_2$ through them for 1 hour at ambient temperature, and the percent hydrolysis was determined to be 0.08 and 0.12% respectively instead of the figures given in Table I for hydrolysis loss by boiling. The higher figures given in Table I apparently come about due to the fact that at the lower temperatures at which the reaction is carried out, the CNCl is much more soluble, so that there is more CNCl in the bottoms which is hydrolyzed on reboiling.

While the invention has been described in connection with a particular reaction column, it is not intended that it be limited to such a reaction column. It will be equally useful with other types of reaction apparatus in which it is desired to feed the chlorine into the liquid reaction medium and effect good gas-liquid contact at high rates of throughput and heat transfer.

It is thought that the invention and its advantages will be understood from the foregoing description and it is apparent that various changes may be made in the form, construction and arrangements of the arts without departing from the spirit and scope of the invention or sacrificing its material advantages, the form hereinbefore described and illustrated in the drawings being merely a preferred embodiment thereof.

What is claimed is:

1. In a method of producing cyanogen chloride by reacting at least stoichiometric amounts of hydrogen cyanide and chlorine in a highly acid liquid reaction medium and recovering cyanogen chloride from said liquid reaction medium, the improvement comprising the step of introducing the chlorine in gaseous form by sparging it into the liquid reaction medium.

2. In a method of producing cyanogen chloride by reacting at least stoichiometric amounts of hydrogen cyanide and chlorine in a column of aqueous reaction medium which has up to about 20% hydrochloric acid therein and from which at least a large part of the heat of reaction is removed during the reaction and recovering cyanogen chloride from said liquid reaction medium, the improvement comprising the step of introducing the chlorine in gaseous form by sparging it into the liquid reaction medium near the bottom thereof.

3. The improvement as claimed in claim 2 wherein the step of sparging comprises sparging the chlorine into the column for filling substantially the entire cross-sectional area of the column with the sparged gaseous chlorine.

References Cited

UNITED STATES PATENTS

| | | | |
|---|---|---|---|
| 2,672,398 | 3/1954 | Huemer et al. | 23—359 |
| 3,011,864 | 12/1961 | Morse et al. | 23—359 |
| 3,197,273 | 7/1965 | Trickey | 23—359 |

OSCAR R. VERTIZ, Primary Examiner

H. S. MILLER, Assistant Examiner

U.S. Cl. X.R.

23—283